June 20, 1944. W. L. MARTIN 2,351,623
OSCILLATING ELECTRIC MOTOR
Filed July 29, 1941 2 Sheets-Sheet 1

INVENTOR.
WENDELL L. MARTIN
BY
Bosworth & Sessions
ATTORNEYS.

June 20, 1944.　　　W. L. MARTIN　　　2,351,623
OSCILLATING ELECTRIC MOTOR
Filed July 29, 1941　　　2 Sheets-Sheet 2

INVENTOR.
WENDELL L. MARTIN
BY
Bosworth & Sessions
ATTORNEYS.

Patented June 20, 1944

2,351,623

UNITED STATES PATENT OFFICE 2,351,623

OSCILLATING ELECTRIC MOTOR

Wendell L. Martin, Shaker Heights, Ohio, assignor to The Martin Brothers Electric Company, Cleveland, Ohio, a corporation of Ohio Application July 29, 1941, Serial No. 404,538

12 Claims. (Cl. 172—126)

This invention relates to electric motors of the oscillating armature type and more particularly to driving motors for electric dry shavers or the like.

Heretofore various types of oscillating armature motors have been employed in dry shavers. In these prior devices an electro-magnet has been used with an armature mounted to oscillate relative to the core of the magnet and to be attracted toward the magnet pole for movement in one direction and to be moved in the opposite direction by spring means. When an alternating current is employed to energize the magnet the armature vibrates or oscillates with a frequency equal to twice the frequency of the applied current. If the usual commercial frequencies of 50 and 60 cycles per second are employed the resulting number of armature strokes will be 100 or 120 per second. This high speed is objectionable because it creates excessive vibration in the device due to the relatively heavy armature cross-section needed in order to conduct the magnetic flux required for satisfactory power. Furthermore this mass of material oscillating at a rate of 120 per second may produce objectionable vibration and noise in the relatively small dimensions which are practical in a device such as a dry shaver or clipper. As the oscillating armature is connected directly to the moving cutter of the device, the high speed of oscillation is also undesirable because it causes relatively rapid wear of the cutter parts and is not required for satisfactory cutting.

I have found that a rate of 50 or 60 oscillations per second is highly satisfactory in a dry shaver as this speed is fast enough to avoid pulling when the cutters are moved over the skin with a normal rate of movement. As the size of the vibrating armature required for the lower frequency operation is substantially the same as that necessary for the higher frequencies, it will be seen that the undesirable vibration and wear may be greatly reduced by using the 60 per second speed.

In addition to oscillating motors which operate at twice the frequency of the applied current, various types of rotary electric motors have been proposed and used. These, however, are not entirely satisfactory for dry shaver use because they require make and break contacts, brushes, etc., and provide rotary motion which must be translated into oscillating motion of the cutter blade.

It is, therefore, among the objects of my invention to provide an oscillating type electric motor in which the armature will oscillate at substantially the frequency of the applied alternating or pulsating electrical current. Other objects of my invention include: the provision of a motor particularly adapted for electric shavers which will have a substantially constant speed of oscillation irrespective of load; the provision of a motor which will be self-starting under all conditions; the provision of a motor of the type referred to which will produce a steady power output and not be disposed to stall under load; the provision of an oscillating motor which will not create radio interference; the provision of an oscillating motor which is extremely sturdy in its mechanical and electrical construction and thus will required a minimum of service, even after long periods of use; the provision of an oscillating motor in which vibration and noise are held to a minimum; and the provision of an oscillating armature motor which has a thin disk-like form particularly suited for embodiment in a dry shaver.

The above and other objects of my invention will appear from the following description of several embodiments thereof, reference being had to the accompanying drawings in which Fig. 1 is a cross-sectional side view of a preferred embodiment of my improved motor, taken on line 1—1 of Fig. 3, the armature being illustrated in the position it assumes when the motor is not operating;

Figure 3:
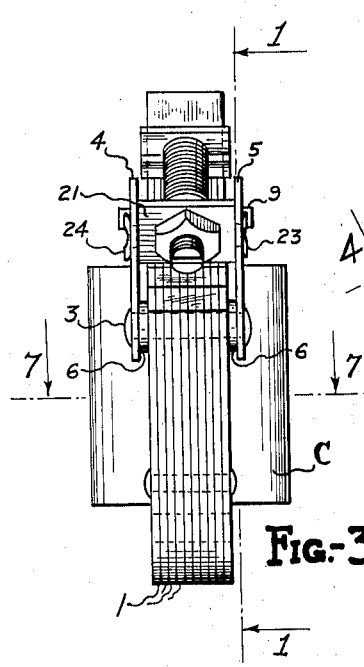
Fig. 3 is an end elevation of the motor shown in Fig. 1.

In Figs. 1 to 7 the field core is generally indicated at F and comprises a plurality of laminations 1 secured together, as by rivets 2 and 3, to build up a core which may be termed generally U-shaped in side elevation. A pair of side plates 4 and 5 are secured on opposite sides of the core F and are spaced therefrom by washers 6. These plates 4 and 5 extend across the open end of the field core and are secured in position by the rivets 3 as is clearly seen in Figs. 1 and 3.

The end faces 7 and 8 of the core F are curved on a radius about the armature shaft 9 which extends through and is supported by the side plates 4 and 5. The pendulum type laminated armature, generally indicated at A, is pivotally supported on the shaft 9 and has curved surfaces 10 and 11 closely adjacent to but not contacting the core faces 7 and 8.

The field coil C is preferably wound to have a generally rectangular inner opening (see Fig. 7) and fits into the central opening in the generally U-shaped field core F. The armature A projects from its pivotal support 9 into the interior of the coil F and its lower end 12 forms a pole face as will be later described. It will be seen from Fig. 5 that the outer laminations on each side of the armature A extend up beyond the inner laminations on the opposite sides of the bearing portion 13 from the pole face 12. These projecting ends 14 and 15 are formed with angular bearing points 16 and 17 and support the driving member 18, which is preferably of fiber or other similar material and is locked into position between the extending ends 14 and 15 of the armature A by the lugs 19 which project through suitable holes in the ends 14 and 15. The armature assembly is held together in any suitable manner as by rivets 20.

Extending across between the side plates 4 and 5 are the adjusting screw supports 21 and 22 which are preferably of nonmagnetic material and may be secured in position between the plates 4 and 5 by projecting lugs which extend through suitable holes in the plates 4 and 5 and are riveted over as seen at 23 and 24 in Fig. 3.

A coil spring 25 is disposed between an abutment disk 26 and an abutment plate 27, the disk 26 having a depressed portion 28 (see Fig. 4) into which the pointed end 29 of the spring adjusting screw 30 extends and which also serves to locate the spring end. In order to provide adjustment of the spring 29 the adjusting screw 30 is threaded through the support 21 and a locknut 31 is employed to retain the screw 30 in adjusted position. The abutment plate 27 is of elongated form and includes a depressed portion 32 and a transversely extending V groove 33. As is clearly seen in Figs. 1 and 2, the angle of the opening of the transversely extending V groove is greater than the angle of the pointed bearing portions 17 of the extending sides 14 and 15 of the armature A and thus the abutment plate 27 provides a pair of bearing points whereby oscillating of the armature A about its pivot shaft 9 is permitted without undesirable distortion of the spring 25 and an extremely simple and effective connection is provided between the spring and the armature A.

The opposing spring 34 is mounted on the opposite side of the armature A from the spring 25. An adjusting screw 35 is threaded through the supporting bar 22 and a locknut 36 serves to lock the screw 35 in adjusted position. At the lower end of the spring 34 is an abutment disk 37 and an abutment plate 38 is employed at the upper end of spring 34. These are substantially identical with the disk 26 and plate 27 and function in exactly the same manner.

From the above description it will be seen that the pendulum armature A is adapted to swing about its pivotal support 9 within the coil C against the resistance imposed by the springs 25 and 34. The bottom pole face 12 of the armature A is adjacent the spaced salient faces 39 and 40 of the field core F. These salient points or faces are separated by an opening 41 and are of like polarity when the field core is energized by current passing through the coil C. Thus, the lower end of the armature A forms one pole which is opposed by another pole on the core F which second pole is divided into spaced salient points or faces 39 and 40.

Figure 1:
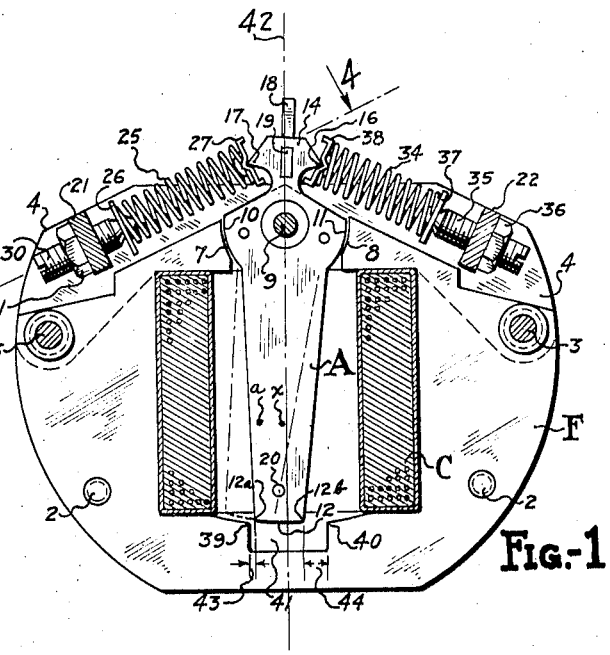
Figure 4:
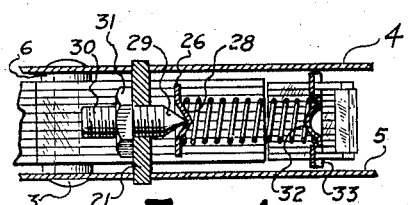
Fig. 4 is a fragmentary cross-sectional view taken on line 4—4 of Fig. 1.

The spring 34 is preferably so constructed as to offer greater resistance to movement of the armature A in clockwise direction (Fig. 1) than the spring 25 offers against movement of the armature A in counter-clockwise direction. The advantages of this arrangement will appear from the following explanation of the operation of my improved motor, it being understood that Fig. 1 illustrates the positions of the parts when the current is turned off and the coil C and field F are not energized. The screws 30 and 35 are preferably so adjusted that the lower end 12 of the armature remains in a position closer to the salient face 39 than to the salient face 40. The point x on the armature A in Fig. 1 represents a point on the center line of the armature and it will be seen that it is disposed on the left-hand side of the vertical center line 42 of the core F. The space or air gap between the corner 12a of the pole face 12 of the armature and the salient face 39 is indicated at 43 while the space or gap between the other salient face 40 and the corner 12b of the armature A is indicated at 44.

When an alternating current of, for example, 60 cycle frequency is applied to the coil C through suitable conductors (not shown) the first increase of the alternating magnetic field to its maximum point will cause the armature A to move toward the salient face 39 due to the attraction between the proposed poles 12 and 39. As the armature is biased to the left or toward the salient face 39 by the adjustment of the springs 25 and 34 the first movement of the armature will always be to the left when the current is initially turned on. This occurs because the gap 43 is smaller than the gap 44. Movement of the armature A to the left will compress the spring 34 and permit the spring 25 to expand. When the magnetic field falls to zero after reaching its maximum, the compressed spring 34 will move the armature A in counter-clockwise direction and, due to the inertia of the armature the center thereof will swing across the vertical center line 42 into a position approximately as shown at y in Fig. 2.

Figure 6:
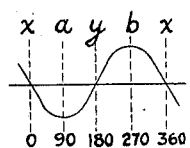
Fig. 6 is an illustrative diagram showing the relation of the alternating magnetic field to the movement of the armature.
Figure 7:
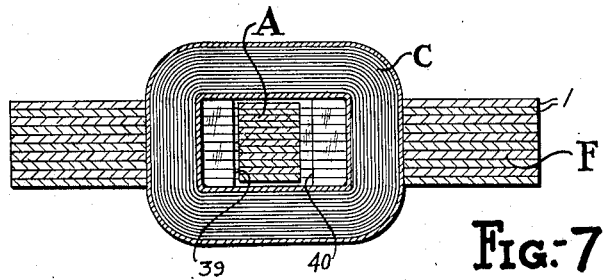
Fig. 7 is a horizontal cross-sectional view taken on line 7—7 of Fig. 3.

As the magnetic field increases to a maximum during the next half cycle, the armature A will be attracted toward the salient face 40 and when the motor is in operation the action will be as illustrated in Fig. 6 during each complete alternation of the applied current. Thus, the armature will move from point x to point a during the first 90° of a cycle. During the next 90° while the magnetic field decreases from maximum to zero, the spring 34 will move the armature from the point a to the point y (shown in Fig. 2). As the field increases again to a maximum at 270° the center of the armature will move from point y to the point b and as the field again falls to zero, completing the cycle of 360° as shown in Fig. 6, the armature will be returned by the spring 24 from the point b back to its starting point at x. This oscillation of the armature will continue for as long as the current is applied and it will be seen that a complete stroke of the armature from $x$ back again to $x$ is completed in a single cycle of the applied current. Thus, with 60 cycle current, the armature will swing at 60 oscillations per second and, correspondingly, with 50 cycle current, would oscillate at 50 strokes per second.

The springs 25 and 34 are so designed and so adjusted by means of the screws 30 and 35 that the normal period of vibration of the armature A is substantially the same as the frequency of the applied current. By advancing or withdrawing the screws 30 and 35, the normal period of vibration of the armature A can be adjusted to suit the current with which the device is to be used. When the motor is first started, the armature may not swing through its full stroke for several cycles but, due to the fact that the initial movement must be against the relatively strong spring 34, it will pick up and operate at its normal amplitude within a very few cycles.

My improved motor may be made with the springs 25 and 34 substantially identical and will operate satisfactorily when so constructed. However, by making the springs of different strengths, the initial setting of the armature A to one side of the center line between the salient faces 39 and 40 is not as critical as with equal springs and, in fact, the motor will be self-starting and will operate when the unequal springs are used, even though the armature be substantially exactly on the center line when the current is applied. This will occur because of the unequal resistance to movement of the armature which will permit it to start and pick up full amplitude after several cycles.

Figure 2:
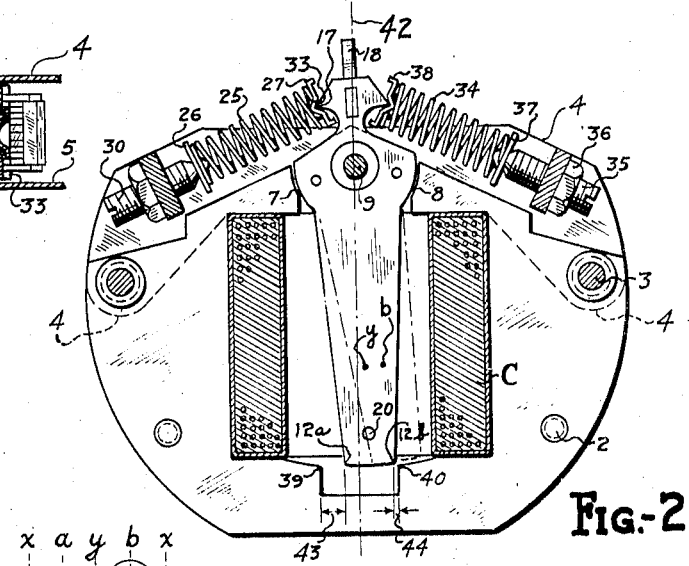
Fig. 2 is a view similar to Fig. 1 but illustrating the armature at another position in its oscillating stroke.
Figure 5:
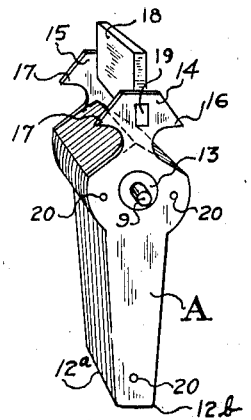
Fig. 5 is a detached perspective view of the armature of the motor shown in Fig. 1.

In Figs. 1 and 2 the extreme positions of the armature A are indicated in dot and dash lines while the full line positions are approximately those of the armature when the magnetization passes through zero. By properly correlating the mass of the armature A and the strength of springs 25 and 34, I am able to produce a motor of the oscillating armature type in which each succeeding half cycle of the energizing alternating current will urge the armature in the opposite direction from the preceding half cycle. This results in an armature speed which is the same as the frequency of the applied current as distinguished from previous motors of this type in which the armature speed is double the frequency of the applied current. The spacing of the salient faces 39 and 40 of the field pole is preferably such that the pole face 12 of the armature A will be disposed between the two salient faces in its normal stationary position. The strength of the springs 25 and 34 plus the damping of magnetic pull as the armature face overlaps the field pole face control the amplitude of the oscillating stroke of the armature and these springs prevent the armature from striking the coil C at the extreme ends of the stroke. Thus, it will be seen that the operation of my motor is substantially noiseless as there are no make and break contacts and no impact engagement of any parts.

Although I have not illustrated my motor incorporated in an electric shaver, it will be understood by those skilled in the art that the driving element 18 may be connected to the moving cutter blade of such a shaver. Due to the disk-like form of my motor, the entire shaver unit may be housed in a flat, easily held casing.

Figure 8:
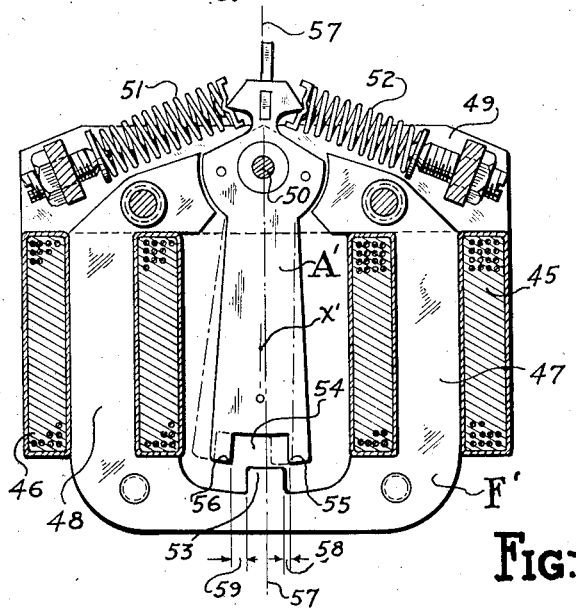
Fig. 8 is a view generally similar to Fig. 1 but illustrating a modified form of my motor.

In Fig. 8 I have illustrated a modified form of my invention in which the field core F' is generally U-shaped but is provided with a pair of energizing coils 45 and 46 wound around the side portions 47 and 48 of the core. Armature supporting side plates 49 are mounted on opposite sides of the core F' and extend across the open end thereof in the same manner as plates 4 and 5 in Fig. 3. Extending across between the plates 49 is a shaft 50 which supports the armature A'. The springs 51 and 52 are similar to springs 25 and 34 and as they are supported and function in substantially the same manner, the details of the adjusting screws need not again be explained.

At the closed end of the core F' a projecting pole 53 extends upwardly toward the lower end of the armature A which is formed with a cutaway portion 54 to form spaced salient faces 55 and 56. Thus, in this embodiment of my invention the spaced salient faces are formed on the moving armature and the opposed pole member is on the stationary field. The springs 51 and 52 are preferably so adjusted that in the normal or de-energized position the armature center is disposed at $x'$, on the left-hand side of the core center line 57 and the gap 58 between the pole 53 and salient point or face 55 is smaller than the gap 59 between the pole 53 and salient face 56.

The operation of the motor of Fig. 8 is substantially the same as that of the motor previously described, it being seen that when alternating current is applied to the coils 45 and 46, which are preferably arranged in series, the armature A' swings to the left because of the attraction between the pole 53 and the nearest salient face 55. After the armature picks up its full amplitude of oscillation, the movement is substantially the same as that of the armature A in Fig. 1. This construction is particularly well adapted for relatively heavy duty motors as it permits an armature of greater cross-sectional area to be employed.

Figure 9:
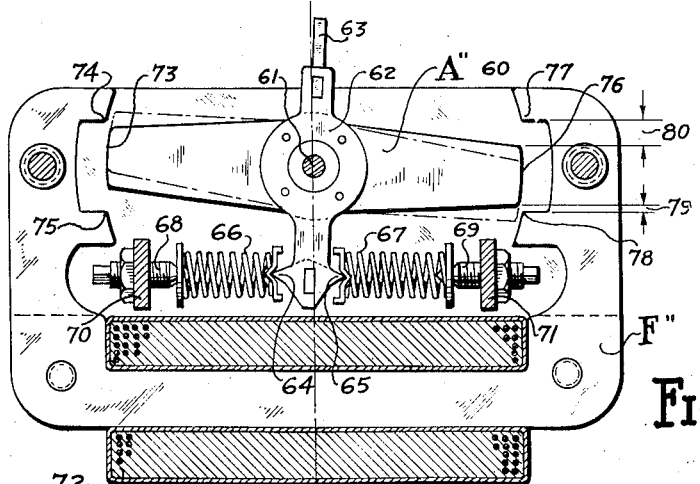
Fig. 9 is a view generally similar to Fig. 1 but illustrating another modification of my oscillating motor.

Another modification of my improved oscillating motor is shown in Fig. 9 in which the field core F'' is also generally U-shaped but the armature A'' is double-ended rather than of pendulum form. Side plates 60 extend across the open end of the field F'' and the shaft 61 supports the double-ended armature A''. Plates 62 extend at right angles to the armature A'' and are secured thereto. These plates carry the driving member 63 at their upper ends and are formed with bearing points 64 and 65 adjacent their lower ends. The springs 66 and 67 are mounted between abutment plates in the same manner as previously described and adjusting screws 68 and 69 are threaded through transversely extending supporting bars 70 and 71. In order to obtain the advantages of my unbalanced spring arrangement the spring 66 is preferably stiffer than spring 67. Wound around the bottom closed portion of the U-shaped core F'' is an energizing coil 72 and each end of the armature A'' is disposed adjacent spaced salient points or faces on the core F''. The end 73 of the armature is normally located between the salient faces 74 and 75 which are of like polarity. In like manner, the end 76 of the armature A'' is disposed between the salient faces 77 and 78 and the springs 66 and 67 are so adjusted that in de-energized position the armature is closest to the salient faces 74 and 78, the gap 79 being smaller than the gap 80. When current is supplied to the coil 72, the salient faces 74 and 78 act together to urge the armature A'' in clockwise direction. By properly tuning the period of oscillation of the armature by means of the springs 66 and 67 and the mass of the armature, the armature will oscillate in step with and at the same rate as the frequency of the applied current.

My adjustable springs permit tuning the period of oscillation of the armature so that it is equal substantially to the frequency of the applied current so that the same motor may be adjusted for use with current supplies of different frequency. Between each rise of the field strength to its maximum value the armature will swing across its mid-position so that each increase in field strength to a maximum will exert a force on the armature urging it in a direction opposite to that of the preceding high point in the field strength.

Although I have described the illustrated embodiments of my invention in considerable detail, it will be understood by those skilled in the art that various modifications and variations might be made in the specific arrangement of parts employed. For example, types of springs other than the coil springs might be used and various connections between the springs and the armature could be employed. I do not, therefore, wish to be limited to the particular embodiments of my invention herein shown and described, but claim all forms thereof coming within the scope of the appended claims.

I claim:

1. An alternating current electric motor of the oscillating armature type including, a stationary core having a pole portion, a coil, an armature supported for oscillating movement relative to said core and having a pole portion adjacent said core pole portion, one of said pole portions being divided into spaced salient faces of like polarity, the other of said pole portions having one less salient face than the said divided pole portion, said armature having a period of vibration substantially equal to the frequency of the alternating current supply whereby each succeeding half cycle of the energizing alternating current will urge said armature in the opposite direction from the preceding half cycle.

2. In an alternating current motor of the type described, a field core, an energizing coil for said field core, and an armature supported for oscillating movement relative to said field core, said armature and field core having adjacent portions constituting opposite poles when said field core is energized by said coil, one of said poles having spaced salient faces of like polarity and the other adjacent pole having a single pole face disposed between said salient faces when said coil is de-energized, and said armature having a period of vibration tuned to the alternating current supply whereby each succeeding half cycle of the energizing alternating current will urge said armature in the opposite direction from the preceding half cycle.

3. In an alternating current motor of the type described, a field core, an energizing coil for said field core, an armature supported for oscillating movement relative to said field core, said armature and field core having adjacent portions constituting opposite magnetic poles when said field core is energized by said coil, one of said poles having spaced salient faces of like polarity and the other adjacent pole being disposed entirely between said salient faces when said coil is de-energized, means for biasing said armature for initial movement toward a particular one of said salient faces when said coil is energized, and said armature having a period of vibration tuned to the alternating current supply whereby each succeeding half cycle of the energizing alternating current will urge said armature in the opposite direction from the preceding half cycle.

4. In an alternating current motor of the type described, a field core, an energizing coil for said field core, an armature supported for oscillating movement relative to said core, and spring means adapted to resist oscillating movement of said armature in both directions, said spring means offering greater resistance to movement of said armature in one direction than in the other direction, and said armature and core having adjacent portions constituting opposite poles when said coil is energized, one of said poles having spaced salient faces of like polarity, the tension of said spring means being such that said armature is moved in one direction by one half wave of the applied current and in the opposite direction by the succeeding half wave.

5. In a motor of the type described, a field core, an energizing coil for said field core, an armature supported for oscillating movement relative to said core, and spring means adapted to resist oscillating movement of said armature, said spring means offering greater resistance to movement of said armature in one direction than in the other direction, and said armature and core having adjacent portions constituting opposite poles when said coil is energized, one of said poles having spaced salient faces of like polarity and the other pole being disposed closer to one of said salient faces than to the other when said coil is de-energized whereby energization of said coil will cause said armature to move initially toward said closer salient face, said spring means being arranged to offer greater resistance to such initial movement of said armature than to movement in the opposite direction 6. In a motor of the type described, a field core having a pole portion, an armature pivotally supported for oscillating movement relative to said core, said armature having a pole portion adjacent the pole portion of said field core, alternating current means for energizing said field core, said armature pole portion and said field pole portion comprising opposed poles one of which has spaced salient faces of like polarity, said armature having a period of oscillation tuned substantially to the frequency of the alternating current to be applied to said energizing means whereby during any particular half cycle of the alternating current said armature will be moved in one direction by attraction between one of said salient faces and the opposed pole, and during the next half cycle will be moved in the opposite direction by attraction between the other of said salient faces and the opposed pole, and whereby said armature will continue to oscillate at the same frequency as that of the applied current during energization of said field core.

7. In a motor of the type described, a field core having a pole portion, an armature pivotally supported for oscillating movement, said armature having a pole portion adjacent the pole portion of said field member, a coil adapted to be connected to a source of alternating current for energizing said field core, said armature pole and field pole comprising opposed poles one of which has spaced salient faces of like polarity, said armature having a period of oscillation tuned substantially to the frequency of the alternating current to be applied to said energizing means whereby during any particular half cycle of the alternating current said armature will be moved in one direction by attraction between one of said salient faces and the opposed pole, and during the next half cycle will be moved in the opposite direction by attraction between the other of said salient faces and the opposed pole, and whereby said armature will continue to oscillate at the same frequency as that of the applied current during energization of said field member, and means for biasing said armature toward initial movement in one direction whereby said motor will be self-starting under all circumstances upon application of alternating current to said coil.

8. In a motor of the type described, an electro-magnet including a laminated core having a pole portion divided into two spaced salient faces of like polarity, a laminated armature pivoted for oscillating movement relative to said core and having a single pole face adjacent said salient faces, a coil surrounding at least a part of said armature and adapted to be energized by alternating current, and opposed spring means disposed on opposite sides of said armature and adapted normally to maintain said armature pole face between said salient faces of said core, said spring means offering greater resistance to movement of said armature in one direction than in the other direction.

9. In an oscillating motor, a laminated core of generally U-shape, a coil disposed in the opening between the legs of said U-shaped core, said core having spaced salient faces of like polarity at its closed end, a laminated armature pivotally supported between the open ends of said core and extending through said coil and having a pole face adjacent said salient faces, and spring means for opposing movement of said armature in either direction about its pivotal support.

10. In an oscillating motor, a laminated core of generally U-shape, a coil disposed in the opening between the legs of said U-shaped core, said core having spaced salient faces of like polarity at its closed end, a laminated armature pivotally supported between the open ends of said core and extending through said coil and having a pole face adjacent said salient faces, and spring means for opposing movement of said armature in either direction about its pivotal support, said spring means being adapted to resist movement of said armature in one direction more strongly than in the other direction.

11. An electric motor comprising an electromagnet energized by alternating current and having a pole portion, an unpolarized armature supported for oscillating movement relative to said electro-magnet and having a pole portion disposed adjacent the pole portion of said magnet, one of said pole portions being divided into two salient faces which are of like polarity at any given instant and the other pole portion having only a single pole face, and resilient means acting between said electro-magnet and said armature and tending to move said armature to a position wherein the salient faces of said divided pole portion are disposed adjacent opposite sides of the other pole portion.

12. In a motor adapted to operate on alternating current, a field structure, an armature supported for oscillating movement relative to said field structure, an energizing coil, said armature and said field structure having adjacent portions constituting opposite magnetic poles when said coil is energized, one of said poles having spaced salient faces of like polarity and the other having a pole face disposed between said salient faces when said coil is deenergized, said current causing said pole face to move toward one of said salient faces during any half cycle, and spring means acting between said field structure and said armature to move said pole face away from said first mentioned salient face and toward the other salient face as said half cycle ceases, with sufficient velocity that said pole face is attracted to the other salient face during the immediately following half cycle

WENDELL L. MARTIN.